United States Patent
Chai et al.

(10) Patent No.: US 7,634,633 B2
(45) Date of Patent: Dec. 15, 2009

(54) METHOD AND APPARATUS FOR MEMORY ADDRESS GENERATION USING DYNAMIC STREAM DESCRIPTORS

(75) Inventors: Sek M. Chai, Streamwood, IL (US); Abelardo Lopez-Lagunas, Toluca (MX)

(73) Assignee: Motorola, Inc., Schaumburg, IL (US)

( * ) Notice: Subject to any disclaimer, the term of this patent is extended or adjusted under 35 U.S.C. 154(b) by 427 days.

(21) Appl. No.: 11/565,198

(22) Filed: Nov. 30, 2006

(65) Prior Publication Data

US 2008/0133877 A1 Jun. 5, 2008

(51) Int. Cl.
*G06F 12/00* (2006.01)
(52) U.S. Cl. ...................... 711/217; 711/218
(58) Field of Classification Search .............. 711/217, 711/218
See application file for complete search history.

(56) References Cited

U.S. PATENT DOCUMENTS

| | | | |
|---|---|---|---|
| 5,628,026 A | 5/1997 | Baron et al. | |
| 6,185,629 B1 * | 2/2001 | Simpson et al. | 710/10 |
| 6,381,687 B2 * | 4/2002 | Sandstrom et al. | 711/213 |
| 6,509,927 B1 * | 1/2003 | Prater et al. | 348/222.1 |
| 6,665,749 B1 * | 12/2003 | Ansari | 710/29 |
| 6,799,261 B2 | 9/2004 | May et al. | |
| 2004/0117595 A1 * | 6/2004 | Norris et al. | 711/214 |
| 2005/0055543 A1 * | 3/2005 | Moyer | 712/225 |

OTHER PUBLICATIONS

Lopez-Lagunas, et al., "Memory Bandwidth Optimization Through Stream Descriptors" ITESM Campus Toluca and Motorola, pp. 1-8;Pub. Date Sep. 17, 2005

* cited by examiner

*Primary Examiner*—Christian P Chace
*Assistant Examiner*—Hashem Farrokh

(57) ABSTRACT

Memory addresses for a data stream are generated by a stream parameter generator that calculates a set of stream parameters for each of a number of memory access patterns and a regional address generator that calculates a sequence of addresses of a memory access pattern from a corresponding set of stream parameters. The stream parameters, which may include START_ADDRESS, STRIDE, SKIP and SPAN values for example, are updated in accordance with an update( ) function. The update( ) function, which may be defined by a user, defines how stream parameters change from one memory access pattern to the next. In one application, the update( ) function describes how the position, shape and/or size of a region of interest in an image changes or is expected to change.

7 Claims, 6 Drawing Sheets

METHOD AND APPARATUS FOR MEMORY ADDRESS GENERATION USING DYNAMIC STREAM DESCRIPTORS

FIELD OF THE INVENTION

The present invention relates generally to data processing systems and in particular to memory address generation in data processing systems.

BACKGROUND

Data processing applications that process streaming data, such as image processing and computer vision applications, demand high bandwidth from memory in order to sustain the high computation workload. Stream descriptors are a set of parameters can be used to describe the shape and location of data elements in a memory so that a stream processor can prefetch, stage, and align data. Stream descriptors can be used to control the action of hardware elements that are configured specifically for computing memory addresses. This reduces the computation load on the processor.

Stream descriptors have been used in partitioned vector processing to describe memory access patterns that exhibit harmonic patterns only. A stream descriptor is represented as a parameter vector (START_ADDRESS, STRIDE, SPAN0, SKIP0, SPAN1, SKIP1, TYPE) where:

START_ADDRESS (SA) represents the memory location of the first data element.
STRIDE is the spacing between two consecutive data elements. This is useful for describing sub-sampling in an image.
SPAN0 is the number of data elements gathered before applying the SKIP0 offset.
SKIP0 is the offset that is applied between groups of SPAN0 data elements.
SPAN1 is the number of data elements gathered before applying the SKIP1 offset.
SKIP1 is the offset that is applied between groups of SPAN1 data elements.
TYPE indicates how many bytes are in each data element, for example TYPE=0 indicates 8-bit pixel values, TYPE=1 indicates 16-bit pixel values, so forth. The terms stream descriptor value and stream parameter can be use interchangeably.

FIG. 1 shows an example set of stream descriptors. Stream descriptors may be used, for example, to describe the memory pattern for a region of interest (ROI) in a digital image stored in a memory. The stream descriptors express both the shape in memory where the data is stored and the order in which the data elements are to be accessed. Stream descriptors may also be used to describe memory locations and data order for non-image data or used with peripherals in the system.

Compilers have been disclosed with the ability to manipulate the stream descriptors so as to enable memory transfer optimizations. Data prefetching at different levels of the memory hierarchy makes data movement more efficient. A "stream loader" is also described that can insert executable code that evaluates stream descriptor values when they are loaded into the streaming data interface. However, there are no methods to describe the dynamic patterns of the memory access. The parameters for the DMA or streaming data interface calculate relative addressing based on a fixed pattern (i.e. using the previous address and then add/subtract a constant value—skip or stride). Furthermore, this restriction limits performance because of its inability to describe more complex patterns.

Existing stream descriptors are not flexible enough to describe certain memory access patterns, since data shape and location can change dynamically during program execution. Overall system performance becomes limited if the stream descriptor value is static.

BRIEF DESCRIPTION OF THE FIGURES

The accompanying figures, in which like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
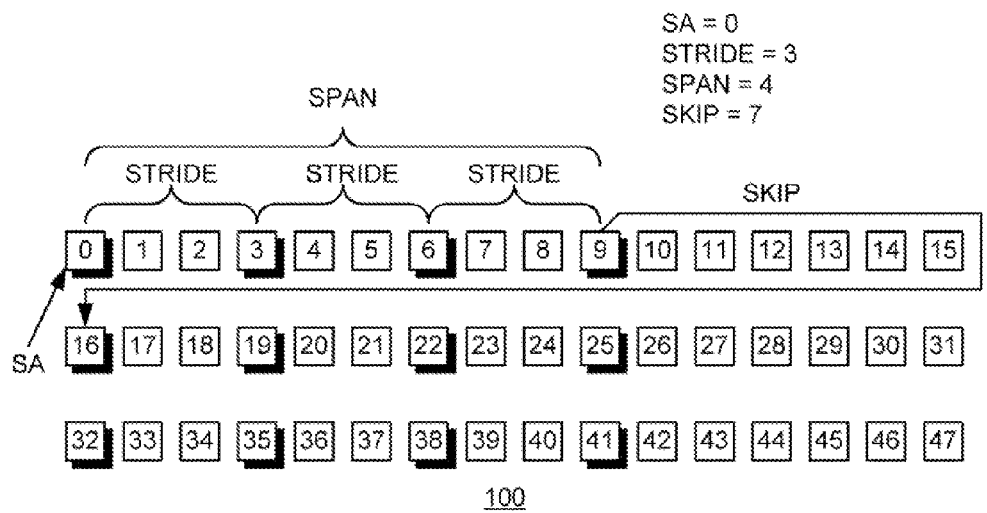
FIG. 1 is a diagrammatic representation of an array of memory elements.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of methods and apparatus components related to memory access for data processors. Accordingly, the apparatus components and methods have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of memory access for streaming data processors described herein. The non-processor circuits may include, but are not limited to, signal drivers, clock circuits, power source circuits, sensors and user input devices. As such, these functions may be interpreted as a method to perform memory access. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention relates to a method and apparatus for accessing data elements in a memory during execution of a program of instructions for processing data. In accordance with one aspect of the invention, the size, shape and/or location can change dynamically during program execution. In one embodiment, the apparatus is controllable in software using an application programming interface (API).

FIG. 1 is a diagrammatic representation of an array of memory elements, numbered sequentially from zero to 47. If the sequence of elements 0,3,6,9,16,19,22,25,32,35,38,41 is to be processed, the memory access pattern can be calculated using the parameters SA, STRIDE, SPAN, SKIP and COUNT (which collectively form a description of the desired data stream) as depicted in FIG. 1, where SA is the starting address in memory. In this simple example, SA=0, STRIDE=3, SPAN=4, SKIP 7 and COUNT=12. The first address is the starting address. Each next address is calculated by adding the STRIDE value to the previous address (0+3=3, 3+3=6, 6+3=9) until SPAN values have be accessed. Then the SKIP value is added (9+7=16) to get the starting address of another series of SPAN values (16, 19, 22, 25). The process continues until COUNT memory addresses have been calculated. A TYPE parameter may be used to specify the size of each data element (in bits or bytes for example).

More complex patterns may be accessed by using additional SPAN and SKIP values. SKIP and STRIDE can have negative values, but SPAN is always positive. In some embodiments, a stream descriptor may be represented with different parameter vector such as (TYPE) or (START_ADDRESS). In yet another embodiment, the parameter vector such as STRIDE, SPAN, and SKIP are constants to represent a static shape in memory (e.g. STRIDE=1, SPAN=1, SKIP=1).

Figure 2:
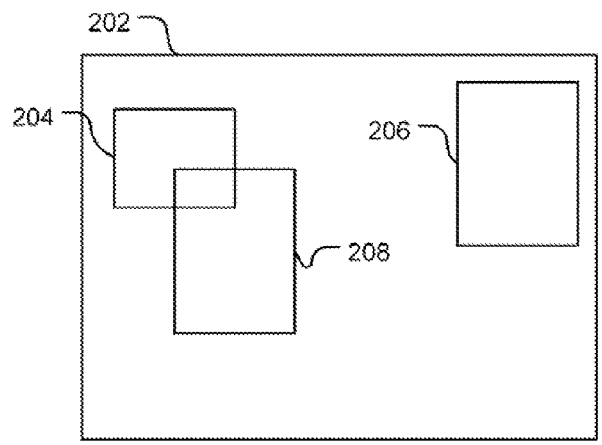
FIGS. 2-5 show exemplary regions of interest in digital image frames.

FIG. 2 shows an example image processing application in which the stream data location and shape change during program execution. FIG. 2 shows an image frame 202 which contains three regions of interest (ROI), 204, 206 and 208. The data values for each ROI are stored in different regions in memory, and the processor must access these memory regions to fetch data for processing. This may be done by defining separate stream descriptors for each ROI.

Figure 3:
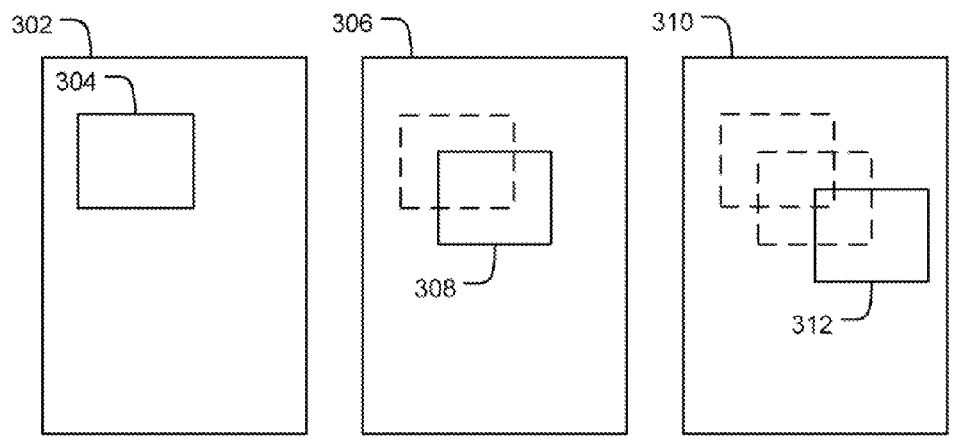

A further example is shown in FIG. 3. In this example a video sequence contains an image frame 302, with ROI 304, an image frame 306, with ROI 308, and an image frame 310, with ROT 312. The ROT has been translated to the right and downwards from one frame to the next. In accordance with an embodiment of the invention, it is recognized that the motion of the ROI can be described by a function, such as a parametric function. The stream descriptors for each ROI are the same except that the starting address SA is updated from one frame to the next. If the change in position is known, the change in starting address can be determined. Thus a new stream descriptor (a new set of stream parameters) can be computed for each new ROI. This computation may be performed by a stream parameter generator, for example.

Figure 4:
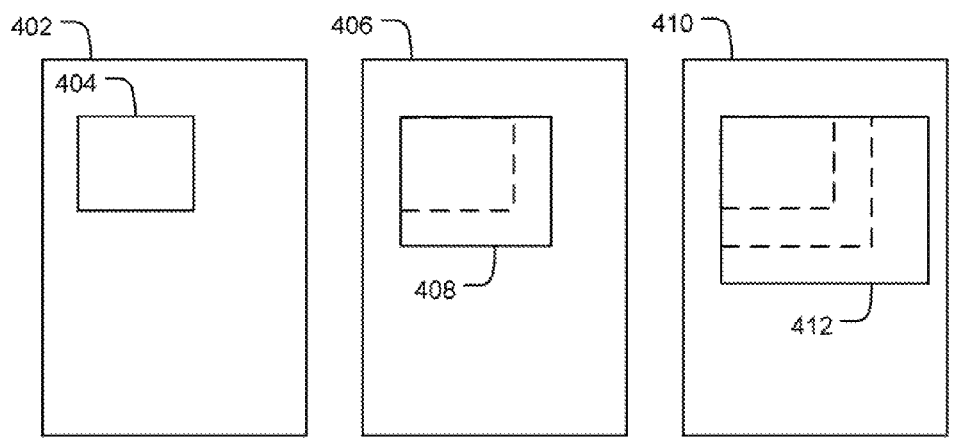

A further example is shown in FIG. 4. In this example a video sequence contains an image frame 402, with ROI 404, an image frame 406, with ROI 408, and an image frame 410, with ROI 412. In this example, starting address (SA) remains constant, but size of the ROI changes from one frame to the next. This may be caused, for example, by a video camera moving closer to an observed object of interest. Again, this results in different memory access patterns based on the speed of camera movement relative to the observed object. The stream descriptor for successive regions of interest may be obtained by updating the values of the SPAN, SKIP and COUNT parameters.

Figure 5:
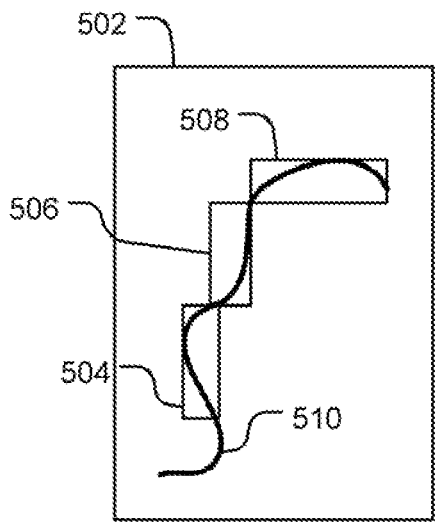

A further example is shown in FIG. 5. In this example an image 502 contains regions of interest 504, 506 and 508. The regions are determined by the position of a feature 510 of the image.

In accordance with an embodiment of the invention, the address of the memory location to be accessed by a stream processor is calculated from the previous current address and a set of stream descriptor values. Further, one or more of the stream descriptor values themselves are calculated from previous stream descriptor values. Thus, one or more of the stream descriptor values is a dynamic value, which changes during processing of a data stream.

The calculation may be performed by arithmetic units in a memory access circuit. An arithmetic unit may be used for each stream descriptor parameter that changes value.

Referring again to FIG. 3, the region of interest (ROI) may be described as a 2-dimensional tile using stream descriptors (e.g. SA, STRIDE, SPAN, SKIP, TYPE, etc. described earlier). This defines a stream record, which represents a data structure that has shape. In one embodiment of the invention, an application user interface (API) is provided. The programmer of an application may use an update( ) function that defines how the starting address (SA) moves in subsequent image frames. This defines the movement of the stream record, and instructs the direct memory access (DMA) or streaming data interface to fetch the next record in the new location. The parameters for the update( ) function can be used to define when the stream descriptors are updated with a change in starting address or a change in any of the stream descriptor parameters.

Figure 6:
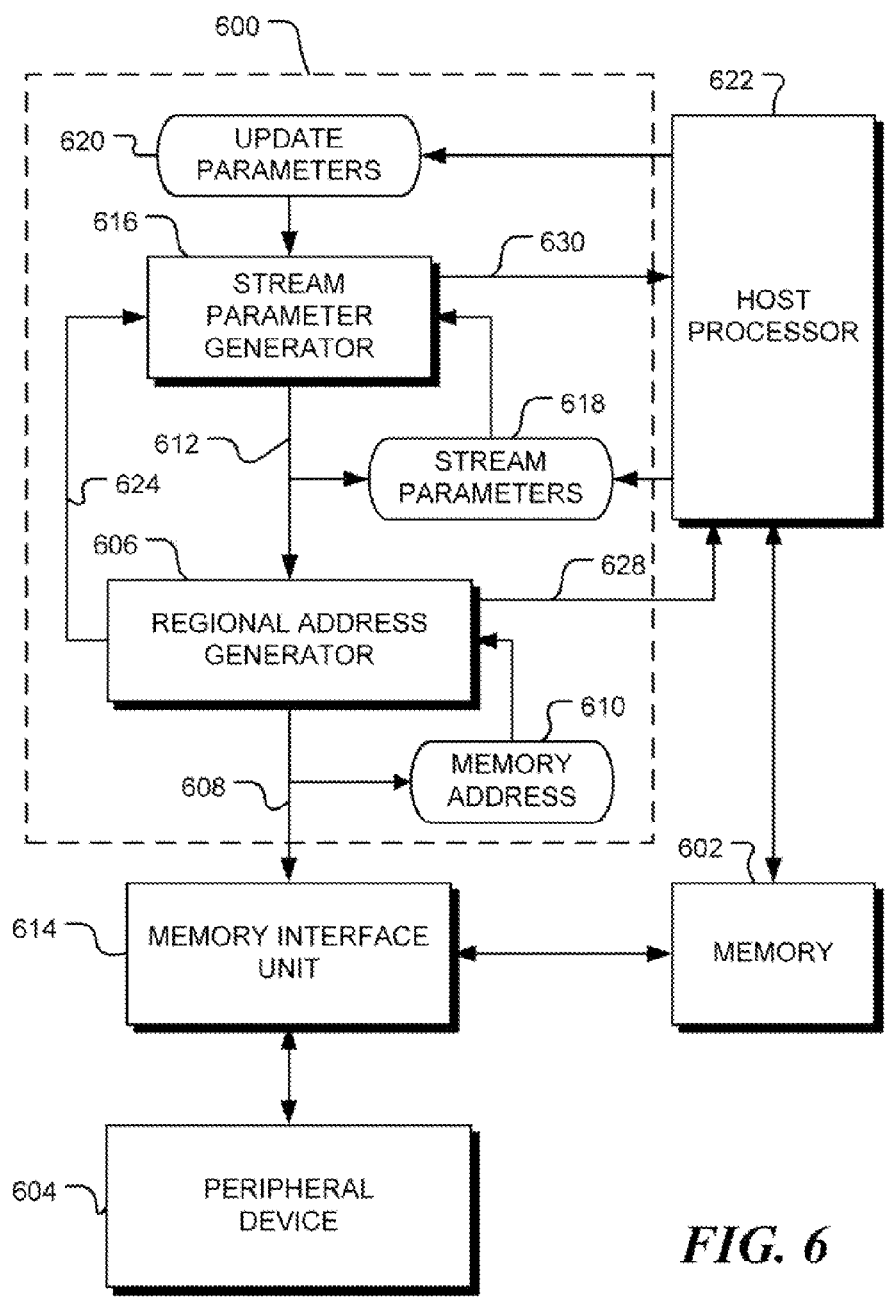
FIG. 6 is a block diagram of a memory access device in accordance with some embodiments of the present invention.

FIG. 6 is a block diagram of a memory address generator consistent with certain aspects of the present invention. The memory address generator may be configured in an application specific integrated circuit or a reconfigurable circuit. Referring to FIG. 6, the memory address generator 600 is used to access a memory 602 and enables a peripheral device 604 to read or write data streams to the memory 602. The peripheral device 604 may be any device that uses data streams as inputs or outputs. The peripheral device 604 may be a hardware accelerator such as a streaming processor, for example. The memory address generator 600 includes a regional address generator 606 that is operable to generate a sequence of memory addresses corresponding to a particular memory access pattern. The pattern may, for example, correspond to the memory locations of a region of interest in a digital image. Before each memory access, the regional address generator 606 calculates the next memory address 608 from the previous memory address 610 and a set of stream parameters 612 (stored in registers, for example) that define memory access within the current region of interest. The memory address 608 is supplied to a memory interface unit 614 that is operable to access the memory 602 at the corresponding address either to read data and provide it to the peripheral device 604 or to receive data from the peripheral device 604 and write it to the memory 602 at the specified memory address. The regional address generator 606 can optionally generate an interrupt signal 628 to the host processor 622 upon completion of the generation of addresses for the current region of interest.

The memory address generator 600 also includes a stream parameter generator 616 that is operable to generate new stream parameters 612 using the previous (or initial) stream parameters 618 and a set of update parameters 620 (stored in registers, for example). The stream parameter generator 616 can also detect predefined sequences of stream parameters to determine which set of update parameters 620 should be applied. In such an embodiment, the stream parameter generator 616 monitors a sequence of stream descriptor updates and decides when to update each stream parameter automatically using a finite state machine. The update of stream parameters may take place automatically without any intervention by host processor 622. The stream parameter generator 616 can optionally generate an interrupt signal 630 to the host processor 622 upon completion of the generation of certain stream parameters for the multiple regions of interest.

The regional address generator 606 is operated for each new memory access within a region of interest, whereas the stream parameter generator 616 is only operated when the focus of attention changes from one region of interest to the next.

The set of update parameters 620 may include, for example, an offset value to be added to the starting address (SA) of a current region to obtain the starting address of the next region of interest. The set of update parameters may also include changes in other stream descriptor values such as the SKIP, STRIDE, and SPAN.

The initial stream parameters 618 and the update parameters 620 may be provided by a host processor 622.

A signal link 624 may be used to enable the regional address generator to signal the stream parameter generator that a region has been fully accessed and that new stream parameters are required.

The memory address generator 600, and in particular the stream parameter generator 616 may be implemented using configurable hardware. Thus, a programmer may specify a variety of updates functions which are compiled and processed and used to configure the stream parameter generator 616 to perform the specified function.

Figure 7:
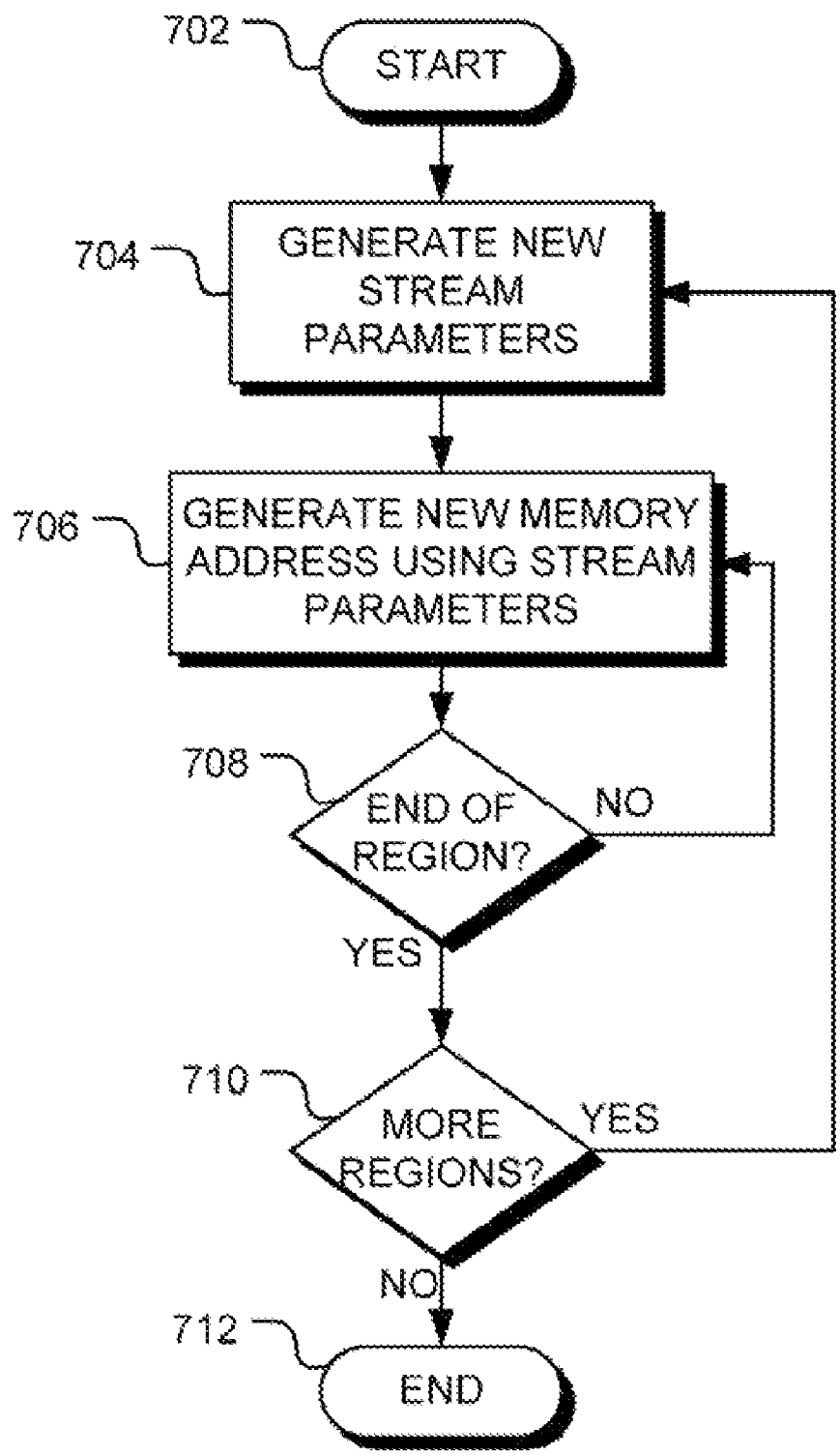
FIG. 7 is a flow chart of a method of address generation in accordance with some embodiments of the present invention.

FIG. 7 is a flow chart of a method of address generation in accordance with some embodiments of the present invention. Following start block 702 in FIG. 7, a set of new stream parameters are generated at block 704 dependent upon one or more functions that describe the change in shape and/or position of the memory region to be accessed. At block 706 a new memory address is generated dependent upon the stream parameters (SA, STRIDE, SKIP, SPAN, COUNT, TYPE, etc.). This memory address may be used to access the memory at the corresponding location. At decision block 708, a check is made to determine if all of the memory locations in the current region of interest have been accessed. If not, as depicted by the negative branch from decision block 708, flow returns to block 706 and the next memory address is generated. If all of the memory locations in the current region of interest have been accessed, as depicted by the positive branch from decision block 708, a check is made at decision block 710 to determine if memory access is required for an additional region of interest. An interrupt signal can be generated for the host processor to indicate the status of the operation. This check may involve a simple count of the number of regions to be accessed, or maybe be dependent upon other factors. For example, in a real-time application, the operation of block 704 may be specified by predicting the change in size, shape and/or position of a region of interest. The check at decision block 710 may include a check as to whether this prediction has held true or if the region of interest needs to be redefined. If there are more region to be accessed, as depicted by the positive branch from decision block 710, flow returns to block 704 where the stream parameters are updated. Otherwise, as depicted by the negative branch from decision block 710, the process ends at block 712.

Since the stream parameters may change from one region of interest to the next, they are termed dynamic stream parameters. The set of stream parameters, together with the associated update( ) function is termed a dynamic stream descriptor.

Figure 8:
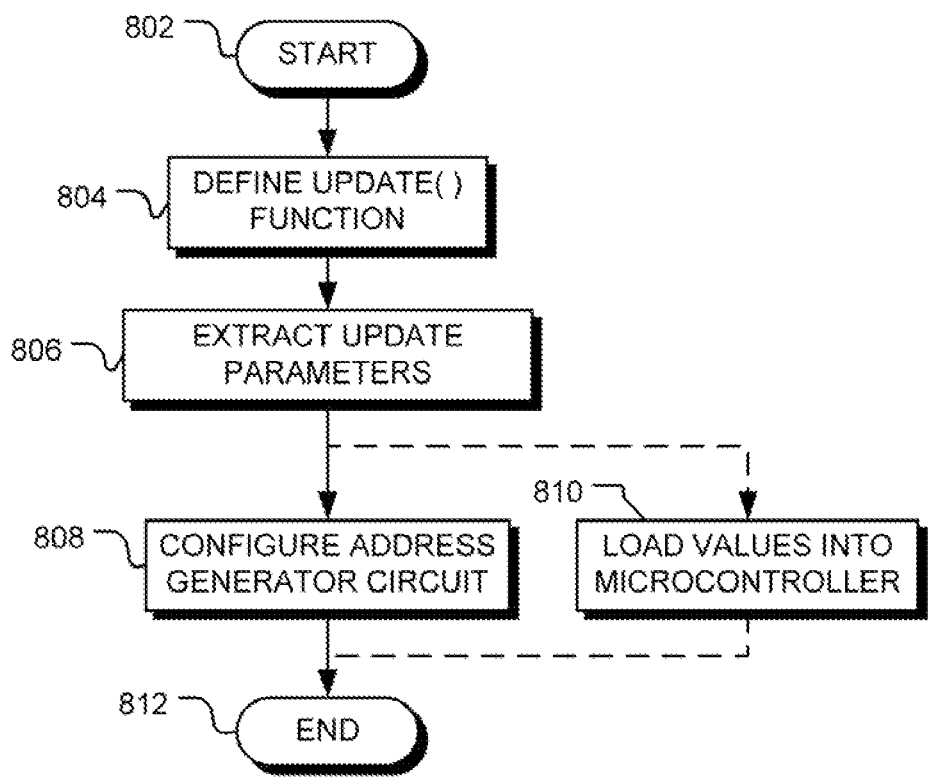
FIG. 8 is flow chart of a method for automatic configuration of an address generator in accordance with some embodiments of the invention.

FIG. 8 is flow chart of a method in accordance with some embodiments of the invention for automatic configuration of an address generator. Following start block 802, an update( ) function is defined at 804. The update( ) function may be defined by a programmer or user. At block 806, the update( ) function is examined by a software tool and a set of update parameters is extracted. At block 808, the update parameters and the update( ) function are used to configure an arithmetic unit of an address generation circuit. In operation, data is transferred through a stream data memory interface that is controlled by an address generator programmed to generate addresses in accordance with stream descriptors, the update( ) function and the update parameters. A compiler can also schedule the loading of a dynamic stream descriptor that is dependent on run time values. Alternatively, at block 810 the update parameters are loaded into a programmable microcontroller or other processor that implements the update( ) function. The process terminates at block 812. A library of update( ) functions, which accept user-defined update parameters, may be provided as part of an application programming interface (API) for an address generation unit.

In one embodiment, an address generation unit can be configured automatically by obtaining a set of stream parameters that describe data locations of the target data, together with a set of update parameters that describe the change of the set of stream descriptors and then generating a representative arithmetic unit based on the set of stream parameters and update parameters.

Figure 9:
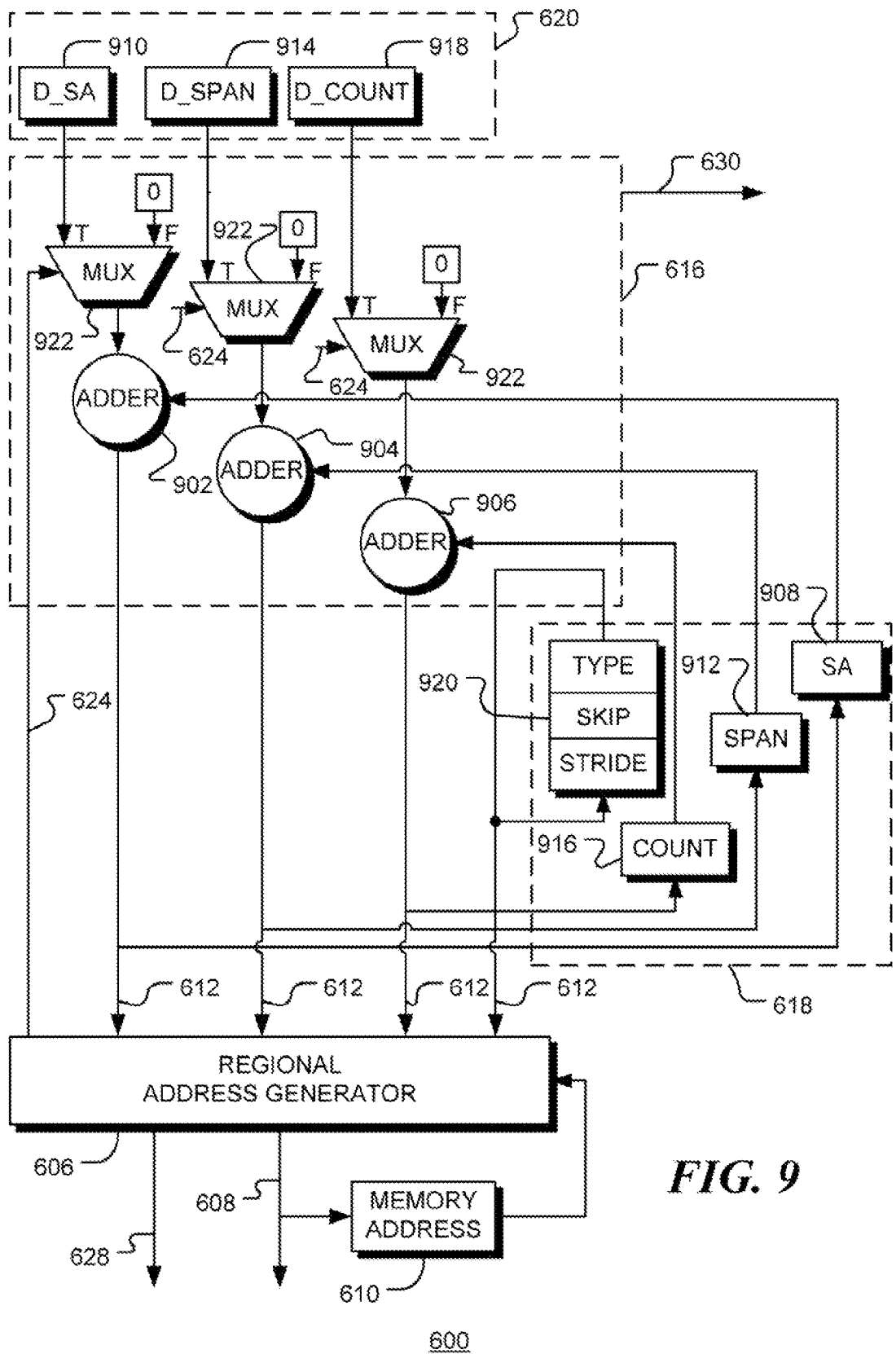
FIG. 9 is a block diagram of an exemplary memory address generator consistent with some embodiments of the invention.

FIG. 9 is a block diagram of an exemplary memory address generator consistent with some embodiments of the invention. Referring to FIG. 9, the memory address generator 600 includes a regional address generator 606 that is operable to generate a sequence of memory addresses corresponding to particular memory access pattern within a region of interest. Before each memory access, the regional address generator 606 calculates the next memory address 608 from the previous memory address 610 and a set of stream parameters 612 that define memory access within the current region of interest. The memory address 608 is supplied to a memory interface unit that is operable to access the memory at the corresponding address. The memory address generator 600 also includes a stream parameter generator 616 that is operable to generate new stream parameters 612 using the previous (or initial) stream parameters 618 and a set of update parameters 620. The regional address generator can generate an interrupt signal 628 for the host processor indicating the completion of the current region of interest. In addition, the stream parameter generator 616 can generate an interrupt signal 630 for the host processor indicating the generation of a stream parameter for a region of interest.

The regional address generator 606 is operated for each new memory access within a region of interest, whereas the stream parameter generator 616 is only operated when the focus of attention changes from one region of interest to the next.

In the example shown in FIG. 9, the regional address generator 606 includes three adders 902, 904 and 906. Adder 902 is operable to update the starting address (SA) of a current region stored in register 908 by adding an offset value D_SA stored in register 910. Similarly, adder 904 is operable to update the SPAN value stored in register 912 by adding an offset value D_SPAN stored in register 914, and adder 906 is operable to update the COUNT value stored in register 916 by adding an offset value D_COUNT stored in register 918. In this example, the values of the other stream parameters, stored in registers 920, are not updated dynamically and are passed unchanged to the regional address generator 606. The register values may be initialized by a host processor. In other embodiments different sets of stream parameters values 920 may be stored in a table and selected dynamically without intervention from a host processor 622.

In the simplified embodiment shown in FIG. 9, multiplexers 922 control when the updates are added to the stream parameters. The multiplexers are controlled by the signal 624 from the regional address generator to select whether a registers value (D_SPAN, D_SA or D_COUNT) or a zero value is supplied to an adder.

An example update( ) function corresponding to FIG. 9 is given below. The function has parameters DX and DY that defines the relative movement of a region of interest (ROI) in a two-dimensional array. Parameters X0 and Y0 that define the upper left corner of the ROI. The function may also define how DX and DY are to be applied (e.g. added or subtracted). Initially X0 and Y0 are set to the upper left corner of the ROI. The update( ) function corresponds to linear motion of the ROI and change of shape of the region of interest. In this example, the region grows by 2 data values in width and is sheared. The corresponding COUNT grows by 10, because 5 rows of data are processed in this example. A check against boundary values Xmin and Ymax is included to ensure the region remains with the array.

```
update( ){
    DX = 2 and DY = 3
    Xmin = DX and Ymax = Height−DY
    X = X0 and Y = Y0
    SA = ( Width * Y − X ) * TYPE
    D_SA = ( Width * DY −DX ) * TYPE
    D_SPAN = 2
    D_COUNT = 10
    While X > Xmin and Y < Ymax {
        X = X − DX
        Y = Y + DY
        SA = SA + D_SA
        SPAN = SPAN + D_SPAN
        COUNT = COUNT + D_COUNT
    }
}
```

The logic circuit for checking that the region of interest is still within the frame is not shown in FIG. 9, but the implementation of similar logic circuits is well known to those of ordinary skill in the art. Furthermore, the update( ) function may have parameters which describes the condition in which the stream parameter generator 616 may generate an interrupt signal 630 for the host processor 622.

Processing applications can include the use of the update( ) function to model and track object movements in digital video data. This is useful in computer vision applications, for example, in which the object location and movement are usually predictable. The use of dynamic stream descriptors allows a programmer to define the object behavior and provide deterministic memory access patterns for the memory subsystem.

For example, in an automotive imaging application, movement of road signs and vehicles may be deterministic because of the way the camera views the road scene. Movement of the object, once determined in the scene, can be defined and tied to memory access using an update( ) function. If certain objects (once identified) such as road markings or vehicles do not follow predictive motions, the algorithm typically enters a warning phase. In such a phase, the algorithm searches the entire scene again which resets the update( ) function and other stream descriptors. The example embodiment shows the update( ) function as applied to SA, but it could be applied to other stream descriptors such as COUNT, for example, to indicate the change in size of the ROI, or stream record. The update( ) function can describe the change in multiple stream descriptor parameters at the same time, and even allow complex interaction between those elements. Referring again to FIG. 5, the feature 510 may be, for example, an edge of the roadway wherein the automotive image application inspects the curvature and road conditions. The application can speculatively define the update( ) function for different predictions of object movements.

In yet another example, in a image distorted by a wide-angle or fisheye lens, the update( ) function can define the movement of the bounding box for the next processing stage. This is equivalent to a sliding window in which the direction of movement is not linear but curved according to the level of lens distortion. Referring again to FIG. 5, the feature 510 may be, for example, a physical straight line that is curved when viewed through a wide-angle or fisheye lens, and wherein the image processing application inspects the line edges for object detection and distortion correction. The application can optionally preset the update( ) function based on lens parameters such as field of view and focal length.

The use of dynamic stream descriptors provides a method for describing the changing shape and location of data and a method to improve memory performance with streaming data. Furthermore, it extends stream processing to other applications because it can describe the behavior of the algorithm better. Performance is improved because less processor intervention is needed to manipulate stream descriptors. Furthermore, the approach enables DMA engines or memory controllers to move data efficiently and reduces bus and memory traffic (allowing more bandwidth in the memory hierarchy for computation rather than data movement).

The present invention can be used with components in memory subsystems (such as memory controllers) to improve their performance.

Without dynamic stream descriptors, an application would have to reset the stream descriptors every time there is a change in the size, shape or position of the region of interest (ROI). For example, for each stream record a new stream descriptor needs to be loaded by the processor. Resetting stream descriptor when a ROI changes is a time consuming operation and can reduce the potential benefits of hardware accelerators.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for accessing elements in a memory, the method comprising:
   calculating a first memory address from a first set of stream parameters;
   accessing the memory at the first memory address;
   calculating a second set of stream parameters from the first set of stream parameters in accordance with an update function;
   calculating a second memory address from the second of stream parameters;
   accessing the memory at the second memory address, wherein the memory contains data for first and second regions of interest of one or more digital images, and wherein the first set of stream parameters describes a memory access pattern for the first region of interest and the second set of stream parameters describes a memory access pattern for the second region of interest; and
   defining the update function in accordance with the expected relationship between the first second regions of interest.

2. A method in accordance with claim 1 further comprising:
   defining the update function;
   extracting update parameters from the update functions;
   configuring a stream update generator circuit of an address generator circuit in accordance with update function; and
   storing the update parameters in the address generator circuit;
   wherein the stream update generator circuit is operable to calculate the second set of stream parameters dependent upon the update parameters.

3. A method in accordance with claim 1 further comprising:
   monitoring changes in stream parameters; and
   identifying the update function dependent upon the changes in stream parameters.

4. A circuit generator operable to configure a system for addressing elements in a memory, the circuit generator comprising:
   a means for configuring a regional address generator, the regional address generator being operable to calculate a sequence of addresses of a memory access pattern from a set of stream parameters;
   a means for analyzing an update function that expresses changes in the set of stream parameters between consecutive memory access patterns; and
   a means for configuring a stream parameter generator operable to update the set of stream parameters in accordance with the update function.

5. A circuit generator in accordance with claim 4, wherein the memory includes a plurality of partitions, and wherein the set of stream parameters comprises at least one stream parameter selected from the group consisting of:
   an SA value denoting a starting address in the memory;
   a STRIDE value denoting the separation between memory elements;
   a SPAN value denoting the number of memory elements in a partition; and
   a SKIP value denoting the separation between partitions.

6. A method for accessing a memory, containing elements from a plurality of regions of interest, in accordance with a set of stream parameters, the method comprising:
   providing an application programming interface (API) to allow a programmer to define an update function that describes how the set of stream parameters change from one region of interest to a next region of interest;
   extracting update parameters from the update function; and
   configuring a stream update generator circuit of an address generator circuit to be operable to update the set stream parameters in accordance with update function and update parameters.

7. A method in accordance with claim 6, wherein the memory includes a plurality of partitions, wherein the set of stream parameters comprises at least one stream parameter selected from the group consisting of:
   an SA value denoting a starting address in the memory;
   a STRIDE value denoting the separation between memory elements;
   a SPAN value denoting the number of memory elements in a partition; and
   a SKIP value denoting the separation between partitions,
   and wherein the update function defines an update to at least one of the stream parameters.

* * * * *

UNITED STATES PATENT AND TRADEMARK OFFICE
CERTIFICATE OF CORRECTION

| | | |
|---|---|---|
| PATENT NO. | : 7,634,633 B2 | |
| APPLICATION NO. | : 11/565198 | |
| DATED | : December 15, 2009 | |
| INVENTOR(S) | : Chai et al. | |

It is certified that error appears in the above-identified patent and that said Letters Patent is hereby corrected as shown below:

Column 3, Line 37, delete "SKIP 7" and insert -- SKIP=7 --, therefor.

Column 3, Line 66, delete "ROT 312. The ROT" and insert -- ROI 312. The ROI --, therefor.

Column 5, Line 50, delete "updates" and insert -- update() --, therefor.

Signed and Sealed this
Twenty-seventh Day of September, 2011

David J. Kappos
*Director of the United States Patent and Trademark Office*